United States Patent

Sands et al.

[11] 3,844,585
[45] Oct. 29, 1974

[54] PIPE COUPLING

[75] Inventors: Robert E. Sands, Shelbyville; Carl E. Floren, Decatur, both of Ill.

[73] Assignee: Mueller Co., Decatur, Ill.

[22] Filed: July 10, 1973

[21] Appl. No.: 378,019

[52] U.S. Cl. .................................................. 285/3
[51] Int. Cl. ........................... F16l 35/00, F16l 37/00
[58] Field of Search ................. 285/3, 4; 137/67, 68

[56] References Cited
UNITED STATES PATENTS

| | | | |
|---|---|---|---|
| 2,933,333 | 4/1960 | Bredtschneider et al. | 285/3 |
| 2,958,545 | 11/1960 | Stelzer | 285/3 |
| 3,285,627 | 11/1966 | Kozulla et al. | 285/3 |
| 3,391,951 | 7/1968 | Miller | 285/3 |
| 3,466,065 | 9/1969 | Acker et al. | 285/3 |

Primary Examiner—H. Hampton Hunter
Attorney, Agent, or Firm—Cushman, Darby & Cushman

[57] ABSTRACT

A pipe coupling for connecting an end of a service pipe or the like into a fluid distribution system such as a water system before or while the system is under fluid pressure. The service pipe may either be a flared end pipe or a flareless or smooth end pipe and it may either be made of plastic materials or a metal. The coupling comprises a first part with a passage therethrough carrying a tubular activating plug having an integral disc intermediate its ends and a cutter member and a second part with a passage therethrough movable toward the tubular activating plug for operatively moving the cutter member so that the cutter member cuts and folds a flap from the disc of the activating plug. The first part and the second part may both be made of a plastic material or metal or one of the parts may be made of a plastic material or metal.

22 Claims, 10 Drawing Figures

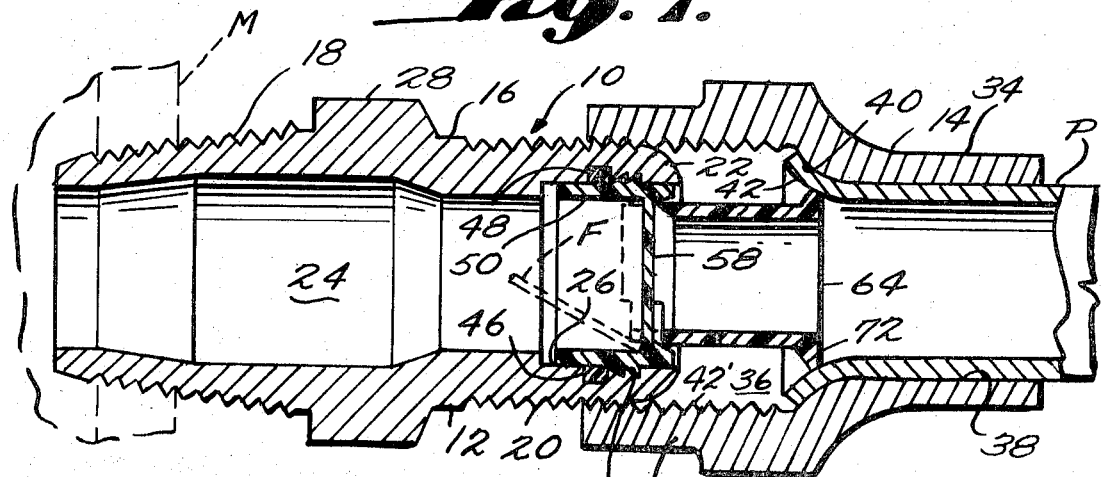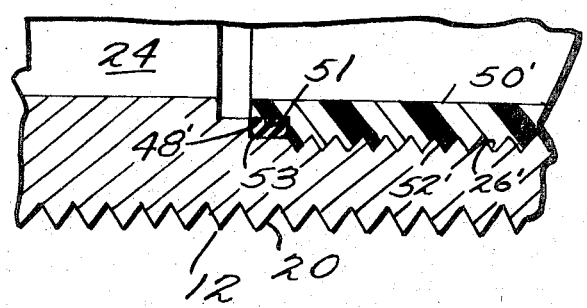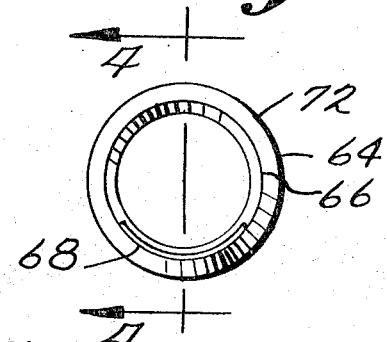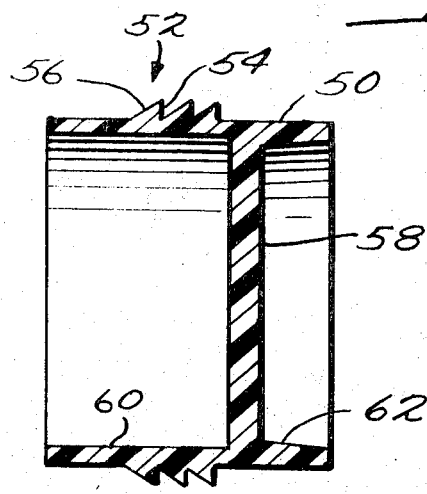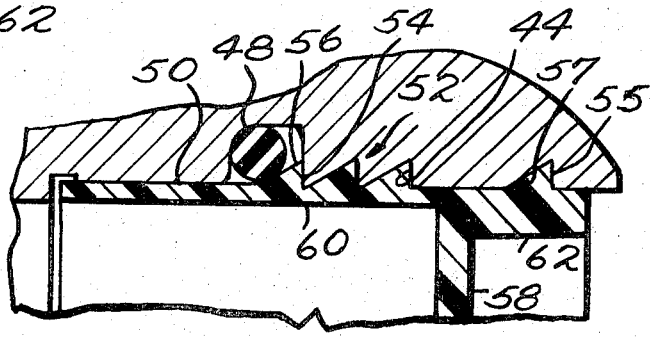

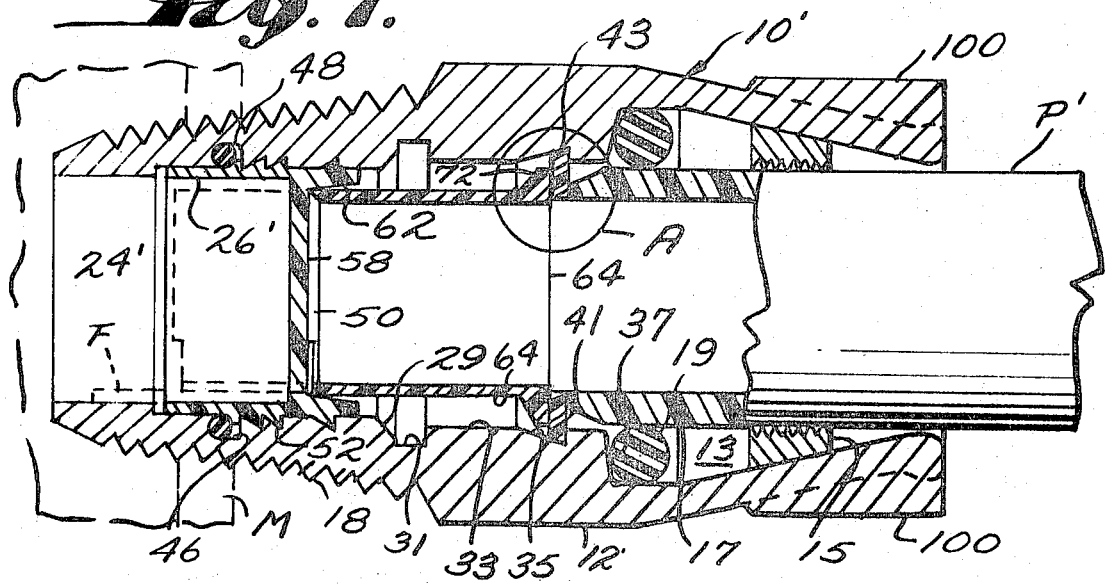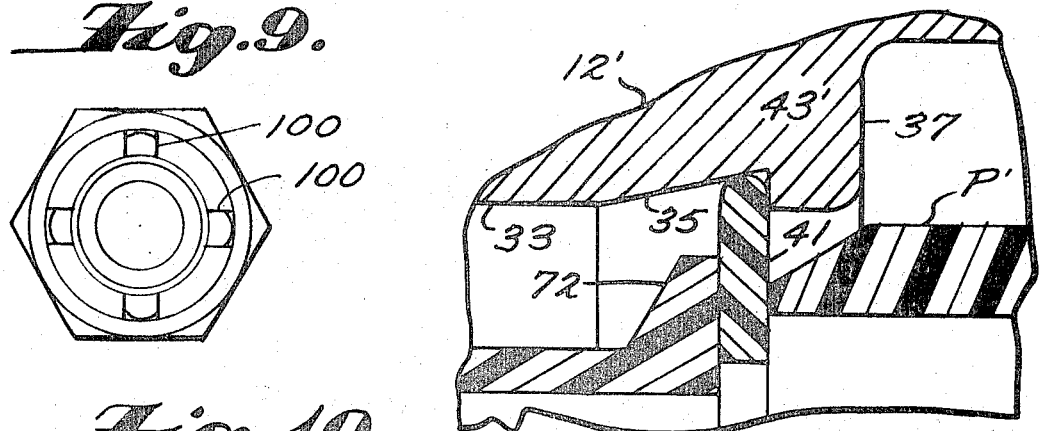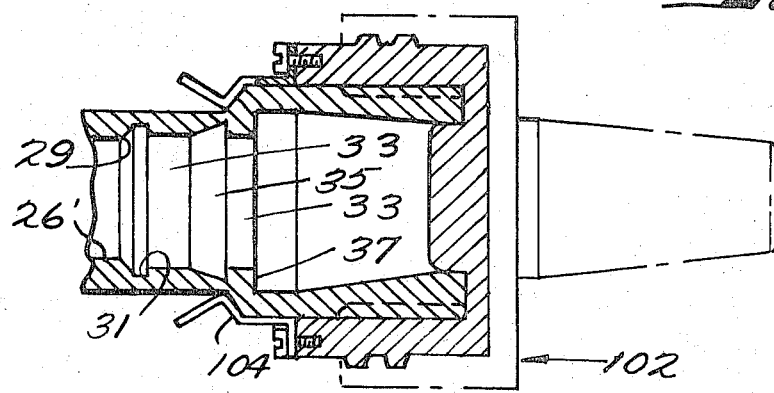

PIPE COUPLING

The present invention relates to a new and improved pipe coupling for connecting an end of a service pipe into a fluid distribution system such as a water system before or while the system is under pressure. The coupling is so designed that it can effect communication with the fluid distribution system immediately upon complete makeup of the coupling or at any time after a partial makeup of the coupling.

BACKGROUND OF THE INVENTION

For many years, efforts have been made to provide satisfactory couplings capable of use in connecting a service line to a fluid distribution system, especially while the system is under fluid pressure. Additionally, efforts have been made to design such couplings so that at least a portion of a part of the coupling could be installed in a main and left there until such time it was necessary to connect the service line to the main. This would eliminate tapping the main with special equipment each time a service line was to be hooked up as taps could be made at the time the main was laid.

One such coupling is disclosed in the common assignee's Mueller Co., U.S. Pat. No. 3,598,428, issued Aug. 10, 1971 to John J. Smith, Lawrence F. Luckenbill, and Peter N. Cassimatis.

In the aforementioned Smith, et al, patent, the coupling comprised two parts, each having a passage therethrough, and the parts being movable axially relative to one another. One of the parts carried a disc provided in an annular groove in the passage of the part and a cutter member arranged to be operatively moved toward the disc to detach the same. The disc could be made of a soluble material if the coupling was to be of the type where it was to be made up within a prescribed time. Of course, when the coupon was cut from the soluble disc, it flowed downstream and eventually dissolved. Also in this patent there was disclosed the use of a non-soluble disc made of a brittle frangible substance so that when the cutter member was activated, the coupon cut out was broken into small enough pieces that theoretically could be flushed downstream and out of the system to provide unobstructed flow of fluid. However, it was found in some instances the small pieces would lodge in valves and water taps and cause malfunction of the same.

Other efforts have been made to provide couplings which can effect communication with a fluid distribution system under pressure and these arrangements have provided metallic diaphragms on both coupling parts, the metallic diaphragms of the two parts being closely positioned together prior to cutting by a cutter member. In such arrangements, the metallic diaphragms were soldered to the respective parts and the cutter members had to cut through both diaphragms to form and fold back a double flap. Usually this type of coupling, when fully made up, did not have a completely unobstructed passage as either a portion of the cutter member extended across the passage or the flap was not folded completely out of the passage. This type of arrangement was costly to manufacture and was not susceptible for use when the coupling parts were made from a plastic material. Additionally, the metallic diaphragms were not arranged to preliminarily position and hold the cutter member until it was intended to use the cutter member to rupture the diaphragm. Most couplings of this type were intended for use in the refrigerant gas systems for eliminating the charging of such systems in the field.

PRIOR ART

Prior art relating to coupling of the type of the present invention is as follows:

| | | |
|---|---|---|
| 1,933,117 | Markle | Oct. 31, 1933 |
| 2,933,333 | Bredtschneider et al. | April 19, 1960 |
| 2,958,545 | Stelzer | Nov. 1, 1960 |
| 3,201,148 | Shurtleff | Aug. 17, 1965 |
| 3,202,442 | Abbey et al. | Aug. 24, 1965 |
| 3,240,227 | Burkholder | March 15, 1966 |
| 3,285,627 | Kozulla et al. | Nov. 15, 1966 |
| 3,391,951 | Miller | July 9, 1968 |
| 3,466,065 | Acker et al. | Sept. 9, 1969 |

BRIEF SUMMARY OF THE INVENTION

Briefly, the coupling of the present invention includes a first part or coupling member having passage therethrough, the first part carrying an elongated tubular activating plug made of a plastic material and having its disc or diaphragm integrally formed therein intermediate its ends to define a first closed bottom bore and a second closed bottom bore. The first bore of the activating plug has a greater diameter than the second bore so as to provide room to fold the cut flap. A second part or member having a passage therethrough cooperates with the first part to move axially relatively thereto for operatively engaging a cutter member preliminarily held in second closed bottom bore of the activating member, the cutter member being moved toward the disc to cut from the same the flap and fold the flap down against the wall of the other or first closed bottom bore. By providing specific means to prevent the activating plug to move axially under fluid pressure in the system prior to rupturing its disc, and by making the activating plug elongated, the same can seal at low pressures as well as at high pressures as the fluid pressure acting on the interior side wall of the first closed bottom bore of the plug, which is in connection with the fluid distribution system, causes the exterior wall of the plug to seal tightly in a counterbore of the passage through the first part or coupling member.

Since the activating plug is made of a plastic material such as low density polyethylene and is provided with means on its exterior for axially restraining the plug when inserted into the first part or coupling member, it may be used with a coupling member made from either a plastic material, such as polyvinylchloride (PVC II) or it may be made from metal such as brass. Other plastics or metals could also be used in making the coupling parts.

The tubular cutter member is provided with an arcuate cutting edge projecting forward of an arcuate noncutting edge at one end thereof, whereas the opposite end is provided with an annular outwardly projecting flange having a fillet shape in cross-section to provide strength when it is operatively engaged by the second part for axial movement toward the rupturable disc of the tubular activating plug. Of course, the arcuate cutting edge is greater than one-half of the circumference of the cutter member. The arcuate noncutting edge of the cutter member has its external surface rounded or beveled so that the same is not blunt at the point of contact with the flap and, thus, the rounded or beveled edge assures the disc will be hinged properly and not sheared off or stretched in the hinged area. Shearing off of the disc would leave a loose piece of plastic in the system which is highly undesirable as it could catch and cause flow blockage or improper operation of valves downstream. Stretching in the hinge region is prevented as described above and insures that the exterior side wall of the cutter will hold the disc down sufficiently so that it cannot be forced up by flow to create a restriction in the flow passage. The cutter member may be made of metal such as stainless steel, but preferably, it is made from one of the harder plastics such as the acetal plastics or the like (for example CELCON) since it is cutting a disc from low density polyethylene or the like.

While the present invention is capable of use with flared end service pipes, it may also be used with a flareless or smooth end service pipe, especially in situations where a stab joint is made, such as disclosed in the common assignee's co-pending Application Ser. No. 249,095, filed May 1, 1972, by Lawrence F. Luckenbill and now U.S. Pat. No. 3,815,940, issued June 11, 1974. The subject matter of U.S. Pat. No. 3,815,940 is incorporated by reference herein to the extent of providing a joint for a flareless or smooth end pipe made of plastic material or a soft metal such as copper or the like.

The foregoing advantages of the present invention will appear more fully in the following specification, claims, and drawings.

DESCRIPTION OF THE DRAWINGS

FIG. 1 is a longitudinal cross-sectional view of the coupling of the present invention illustrating the relatively axially movable parts or coupling members in a partially assembled position just prior to the final full makeup of the coupling;

FIG. 2 is an enlarged fragmentary longitudinal cross-sectional view showing a modification of the means for holding the tubular activating plug in one of the coupling members;

FIG. 3 is an end view of the cutter member of FIG. 1 looking from the left to the right thereof;

FIG. 4 is a sectional view of the cutter member taken on the section line 4—4 of FIG. 3;

FIG. 5 is an enlarged longitudinal cross-sectional view of the tubular activating plug of the coupling disclosed in FIG. 1;

FIG. 6 is an enlarged fragmentary longitudinal crossection of a modified activating plug.

FIG. 7 is a longitudinal cross-sectional view similar to FIG. 1, but illustrating a modified form of the coupling of the present invention for use with flareless pipe, the view illustrating the pipe being stabbed into the joint and at a point where continued inward movement will actuate the cutter member;

FIG. 8 is an enlarged fragmentary sectional view taken in the enclosure identified at A in FIG. 7, but showing a slight modification of the split ring;

FIG. 9 is an end view looking from the right of FIG. 7 and on a reduced scale, the view illustrating the lugs for engaging a special tool so that the coupling member may be threaded into a main;

FIG. 10 is a longitudinal sectional view on a reduced scale of FIG. 7 disclosing the special tool in position and enclosing the open end of the coupling member, the internal parts of the invention being omitted for purposes of clarity.

DETAILED DESCRIPTION OF THE INVENTION

Referring now to the drawings wherein like character or reference numerals represent like or similar parts and, in particular to FIGS. 1, 3, 4, and 5, the pipe coupling or joint of the present invention is generally designated at 10 and includes a first part or coupling member 12 and a second part or coupling member 14. The coupling member 12 includes a body 16 having exterior threads 18 at one end thereof for threading into a main M and exterior threads 20 terminating in a rounded nose portion 22 at the other end thereof. The main M is part of a fluid distribution system, such as a water system, and may or may not be under pressure at the time member 14 is attached thereto. A passage 24 extends completely through the body 16, the passage including a counterbore 26 in the end of the body having the nose portion 22. Intermediate the threads 18 and 20 there is provided a center portion 28, preferably hexagonal in shape, for receiving a wrench or the like when it is desired to thread the part 12 into a tapped or drilled hole in the main M. Of course, instead of using threads 18, the part 12 may be of a different configuration, depending upon the element to which the coupling member 12 is to be attached. For example, the coupling member could be welded to the main or to a pipe.

The part or coupling member 14 is disclosed in FIG. 1 as a female coupling member or sleeve nut having an enlarged end portion 30 with a hexagonal wrench receiving configuration at 32 for receiving a wrench and a reduced end portion 34. The part 14 has a passage 36 therethrough which includes a bore 38 in the reduced end portion 34 which flares outwardly as indicated at 40, the flaring portion terminating at the inner end of interior threads 42' which are complementary with the threads 20 on the part 12. A pipe P, which may be a plastic or copper pipe or the like, fits through the bore 38 in the reduced portion 34 and has a flared end 42 bearing against the flared surface or portion 40 of the part 14.

Both parts 12 and 14 may be made of either a plastic material, such as polyvinylchloride (PVC II) or the like, or metal such as brass or the like. Of course, one part 12 or 14 may be made of a metal, whereas the other part 12 or 14 may be made of plastic, depending upon the desired type of joint.

Counterbore 26 in the part 12 is provided with a plurality of annular grooves 44 which have a saw tooth configuration in longitudinal or axial section, each of the grooves having one substantially radial surface facing toward the fluid distribution system as defined by the main M and away from the other part 14. Adjacent the innermost groove there is provided an annular O-ring groove 46 which receives an O-ring 48 that bears against the exterior surface of an elongated tubular activating plug 50.

The activating plug 50, which is preferably made from a low density polyethylene, has an outside diameter substantially equal to the diameter of the counterbore and is provided on its exterior surface a plurality of annular teeth 52 complementary in shape to the grooves 44 in the counterbore 26. In other words, the teeth 52, as shown in FIG. 5, are of saw tooth configuration in longitudinal or axial section and they have a substantially radial surface 54 facing away from the fluid distribution system and outwardly toward the other part for cooperating with the corresponding surfaces of the grooves. Each of the teeth 52 has a second or camming surface 56 which permits the activating plug 50 to be axially inserted into the counterbore 26 of the part 12. The annular teeth 52 and the annular grooves 44 are preferably continuous about the respective counterbore 26 and activating plug 50, although they may be interrupted circumferentially if desired.

As best shown in FIG. 5, the activating plug 50 is provided with a disc 58 intermediate its ends to define a first closed bottom bore 60 and a second closed bottom bore 62. The closed bottom bore 62 tapers inwardly so that it is provided with a minimum diameter adjacent the disc 58 which is less than the diameter of the closed bottom bore 60. The purpose of having different diameters is so that when the disc 58 is cut by a tubular cutter member 64, it will have sufficient area to provide a hinge for the flap F (shown in broken lines in FIG. 1) to fold over and downwardly completely against the surface of the bore 60.

Referring now to FIGS. 3 and 4, the tubular cutter member 64 is provided at one end with an arcuate cutting edge 66 projecting forward of an arcuate non-cutting edge 68. The non-cutting edge 68, which is of less arcuate extent than the cutting edge 66, is rounded or beveled at least on its outside, as indicated at 70, so that the same is not blunt, the purpose of this being to prevent shearing or stretching of the plastic in the hinge area of the flap as the cutter member 64 is axially advanced toward and through the disc 58. The opposite end of cutter member 64 is provided with an annular outwardly projecting flange 72 which is fillet shaped in longitudinal section so as to provide more rigidity for the cutter member in the area of the flange 72. It will be noted from the reference to FIG. 1 that the cutter member 64 has a diameter slightly greater than at least the minimum diameter of the second closed bottom bore 62 and, consequently, the cutter member can be frictionally held in the tapered closed bottom bore 62 until activated.

Referring back to FIG. 1, and with the cutter member 64 held in the position shown by the inwardly tapered closed bottom bore 62, the sleeve nut 14 is threaded onto the member 12 until the flange 72 engages the interior of the flared end 42 of pipe P. When in this position, the joint or coupling 10 may be activated merely by further threading of the sleeve nut 14 onto the member 12 as this will move the cutter member 64 axially without rotation, cutting from the disc 58 the flap F and folding the same downwardly against the closed bottom bore 60. When the flared end 42 of the pipe bottoms on the nose portion 22 of member 12, there will be complete unobstructed flow through the passage 24 into the pipe P and a seal is obtained to prevent external leakage. The flap F, held completely down by the exterior wall of the cutter member 64, prevents the flow of fluid from getting under the flap and from moving it to a position to cause blockage or partial blockage of the passageway.

Prior to activating the cutter member 64, pressure in the main M will also be in the passage 24 and will be working outwardly against the interior wall of the first closed bottom bore 60. Should any fluid get between the exterior wall of the activating plug 50 and the wall of the counterbore 26, the O ring 48 will provide an additional seal as it will be wedged tightly against the camming surface 56 of the first tooth of the plurality of teeth 52 and the wall of the annular groove 46. This latter condition would only occur at low fluid pressures.

Referring to FIG. 2, there is disclosed a slight modification in the design of the activating plug 50'. In this modification, the counterbore 26' is provided with interior threads on its surface which cooperate with exterior threads 52' on the activating plug 50'. Consequently, the activating plug 50', instead of being pushed axially into the counterbore, is threaded into the same and, thus, cannot be moved axially by fluid pressure once fully threaded into position. The end of the plug 50' may be provided with an annular cutout 51 which defines with a similar annular cutout 53 in the body 16, an O ring chamber for the O ring 48', this O ring preventing the escape of low pressure fluid between the threads. Of course, the end of plug 50' may be unthreaded and arranged to terminate short of the radial wall of the cutout 53 so as to provide the O ring chamber.

Reference now to FIG. 6, there is disclosed a still further modification of the activating plug 50. In this modification, an extra tooth 55 is provided at a spaced distance from the teeth 52 outwardly of a plane through the disc 58, the tooth 55 being annular and received in an annular groove 57. By spacing the tooth 55 outwardly of the other teeth 52 and not in the area of a plane through the disc 58, the plug 50 can still be easily inserted into the part 12 as the disc does not have to be deformed as would be the case if the tooth were inserted in the area of the disc. The extra tooth 55 makes the plug capable of withstanding higher burst pressure than where all teeth are on the inner side of a plane through the disc 58. Additionally, the extra tooth 55 is held in place before and during cutting by the wall of the cutter member 64.

Referring now to FIGS. 7 and 8, there is disclosed a further modification of the coupling or joint of the present invention. In this modification, instead of a flared end pipe P, a smooth end or flareless service pipe P' is connected to the coupling 10' in the manner disclosed in detail in the aforementioned U.S. Pat. No. 3,815,940. Briefly, the coupling 10' includes an elongated body member 12' provided with a passageway therethrough, the passageway including a tapering or frusto-conical shaped chamber 13 having a split annular gripper ring 15 therein. Additionally, at the inner end of the tapering chamber 13, there is provided a cylindrical bore defining an annular sealing chamber 17 for carrying an O ring 19. As is disclosed in the aforementioned U.S. Pat. No. 3,815,940, it is merely necessary to "stab" the pipe P' through the split gripper ring 15 and through the O ring 19 until it engages a stop and then any outward pull on the pipe P' will cause the split gripper ring 15 to cam tightly about the pipe as it slides in the tapering frusto-conical shaped chamber 13.

The body member 12' is provided with exterior threads 18 so that the opposite end from the end having the coupling means therein can be received in a tapered or drilled hole in the main M. As shown in FIG. 7, the passage 24' through the body member 12' is provided with a counterbore 26' which receives the activating plug 50, in this instance, one of the type disclosed in FIG. 6. As already described, the plug 50 is provided with a plurality of teeth 52 on the fluid distribution side of a plane through the disc 58, the teeth cooperating with grooves 44 in the counterbore 26 and an extra tooth 55 and groove 57 on the opposite side of the disc. There is an additional groove 46 adjacent the innermost tooth 52 for forming an annular chamber to receive the O ring 48.

The cutter member 64 is identical to that disclosed in FIGS. 3 and 4 and the detailed description of the same given heretofore will suffice. However, it will be understood that the cutter member 64 is held in the second closed bottom bore 62 of the activating plug 50 until such time the cutter member is used.

At the outer end of the counterbore 26, there is an outwardly flaring shoulder 29 which is adapted to act as a stop for the cutter member 64 when the shoulder is engaged by the flange 72 of the cutter member. An annular groove 31 is provided adjacent the annular outwardly flaring shoulder 29. A second counterbore 33 of a greater diameter than the counterbore 26, but of less diameter than the annular groove 31, extends from the groove 31. Counterbore 33 is provided intermediate its ends with a frusto-conical shaped annular groove 35, the counterbore terminating in an outwardly extending shoulder 37 which defines one wall of the chamber 17 for the O ring 19.

Referring back to the frusto-conical shaped annular groove 35, there is provided an annular split ring 41 which is equivalent to the second part 14 of the first described arrangement. The split ring 41 may be of a plastic material, such as "Celcon" or the like or a metal, such as brass or spring steel, and it will be noted that its peripheral surface has a taper 43 (FIG. 7) to the inwardly tapering camming wall of groove 35. However, the peripheral surface of the ring 41 may be rounded as shown at 43' (FIG. 8) or cylindrical and still cooperate with the camming wall of groove 35 and when this is done, the ring 41 can be assembled in the groove with either side forward. The use of the term "inwardly" here and throughout the specification generally means toward the fluid distribution system.

As shown in FIGS. 7 and 8, the pipe P' has been stabbed part way into the body member 12' to a position where it is engaging the split ring 41 which, in turn, is flush against the flange 72 of the cutter member 64. By further axial movement of the pipe P' inwardly toward the main M, the split ring 41 will begin to contract as it moves axially as it is cammed by the groove 35 and it will cause the cutter member 64 to move axially and cut a flap F from the disc 58 in the activating plug 50. When the flange 72 of the cutter member abuts the shoulder 29, this will be as far as the cutter member can go and, thus, it operatively acts as a stop of further inward movement of the pipe P' by the stabbing operation. By this time, the split ring 41 will be in the area of the annular groove 31 and it will spring back to its original diameter and, in effect, it will act as a stop for the cutter member to prevent the same from ever moving downstream. The gripper means 15 and the O ring 19 will function as disclosed in U.S. Pat. No. 3,815,940. Thus, if there is any outward movement of the pipe P', it will be gripped tightly in place.

While the body member 12' could be provided with exterior threads 20 and a hexagonal shaped center portion 28, the outer end portion of the body member 12' is provided with circumferentially spaced longitudially extending lugs or ribs 100 which are utilized for providing a rotary motion when threading the body member 12' into the main M. As shown in FIGS. 9 and 10, the lugs 100 are arranged to receive on either side of the same a portion of a special tool generally designated at 102, the tool having a plurality of spring clips 104 for holding the same axially in position. As will be appreciated by those skilled in the art, the tool has suitable longitudinally extending grooves to receive the lugs and, thus, when the tool is rotated, it will turn the body member 12'. Additionally, since this tool completely caps the end of the passageway in the body member 12', it may be used as a cap to cover the end of the coupling 10' once the coupling has been inserted into the main M prior to activating the cutter member or the insertion of the service pipe P', or it could be removed and replaced with a cap plug.

With regard to the disclosure shown in FIG. 1, it will be appreciated that after the part 12 has been inserted into the main M and it is not desired to immediately activate the system, the sleeve nut 14 can be threaded onto the part 12 without the pipe P therein until it bottoms. With the cutter member in place in the activating plug 50, then a cap plug (not shown) can be placed over the reduced portion 34 of the sleeve nut to protect the cutter member and the activating plug until such time there is a desire to connect up a service pipe.

The terminology used throughout this specification is for the purpose of description and not limitation, the scope of the invention being defined in the appended claims.

What is claimed is:

1. A coupling for use in connecting an end of a service pipe to a fluid distribution system before or while the system is under fluid pressure comprising:
a first part and a second part movable relative toward each other, said parts each having a passage therethrough, said first part being connected to said fluid distribution system and having a counterbore in its passage, an outwardly facing annular shoulder between said counterbore and the passage of said first part, an activating plug carried in the counterbore of said first part, said plug being tubular and having a rupturable disc formed integrally therein intermediate its ends to define a first closed bottom bore facing the shoulder of said first part and a second closed bottom bore facing said second part, at least one of said first part and said activating plug being a plastic material, cooperating means on said activating plug and the wall of said counterbore of said first part to permit said activating plug to be inserted into said counterbore and after insertion, to retain said activating plug in said counterbore against axial movement outwardly of said first part by fluid pressure in said fluid distribution system, said cooperating means for insertion of and retaining of said activating plug in said counterbore including a plurality of axially spaced teeth on the periphery of said plug, said teeth having a saw tooth configuration in longitudinal radial section with a substantially radial surface facing away from said fluid distribution system and a plurality of grooves complementary to said teeth, said grooves being in the wall of the counterbore of said first part, and a tubular cutter member carried between said first and second parts and having an arcuate cutting edge projecting forward of a non-cutting forward edge and facing said disc, said cutter member being movable toward said disc when said first and second parts are moved axially toward one another to cut and fold a flap from said disc.

2. A coupling as claimed in claim 1 in which said teeth on said plug and said grooves in said counterbore are at least spaced inwardly of a plane through said disc.

3. A coupling as claimed in claim 2 including a further tooth on the periphery of said plug spaced axially outwardly of the plane through said disc and a groove in said counterbore complementary to said further saw tooth.

4. A coupling as claimed in claim 3 in which said teeth and said complementary grooves are annular.

5. A coupling as claimed in claim 4 including an annular groove in the counterbore of said first part adjacent the innermost one of said teeth and sealing means positioned in said annular groove and forming a seal between said plug and said first part.

6. A coupling as claimed in claim 1 in which said activating plug is plastic.

7. A coupling as claimed in claim 6 in which said tubular cutter member is plastic and is provided at its end and opposite its cutting end with an annular outwardly projecting flange.

8. A coupling as claimed in claim 7 in which said noncutting edge of said cutter member is rounded in axial section to prevent shearing or stretching of the plastic flap in its hinge area.

9. A coupling as claimed in claim 7 in which said first part and second part are made from a plastic material.

10. A coupling as claimed in claim 1 in which said first part and said second part are each made from metal.

11. A coupling as claimed in claim 1 in which said first part and said second part are each made from a plastic material.

12. A coupling as claimed in claim 1 in which at least one of said first part and said second part are made from a plastic material.

13. A coupling as claimed in claim 1 in which said second closed bottom bore of said activating plug and facing said second part tapers inwardly toward said disc and has a minimum diameter for frictionally holding the cutter member in position prior to its use.

14. A coupling as claimed in claim 1 in which said first part is a first coupling member having threads thereon and said second part is a second coupling member having threads thereon for cooperating with the threads of said first coupling member, said second coupling member having a portion of its passage flaring outwardly and facing said first coupling member and receiving a flared end of the service pipe, the flared end of the service pipe engaging and moving the cutter member when said first coupling member and said second coupling member are threaded into engagement with each other.

15. A coupling as claimed in claim 14 in which said first coupling member has exterior threads and said second member has interior threads.

16. A coupling as claimed in claim 1 in which said second closed bottom bore of said activating plug has a diameter adjacent said disc less than a diameter of said first closed bottom bore adjacent said disc whereby the flap can hinge when cut from said disc.

17. A coupling as claimed in claim 16 in which said cutter member has an outside diameter less than the diameter of said first closed bottom bore and wherein said cutter member is frictionally held in said second closed bottom bore prior to cutting said flap.

18. A coupling for use in connecting an end of a service pipe to a fluid distribution system before or while the system is under fluid pressure comprising:

a first part and a second part movable relative toward each other, said parts each having a passage therethrough, said first part being connected to said fluid distribution system and having a counterbore in its passage, an outwardly facing annular shoulder between said counterbore and the passage of said first part, an activating plug carried in the counterbore of said first part, said plug being tubular and having a rupturable disc formed integrally therein intermediate its ends to define a first closed bottom bore facing the shoulder of said first part and a second closed bottom bore facing said second part, cooperating means on said activating plug and the wall of said counterbore of said first part to permit said activating plug to be inserted into said counterbore and after insertion, to retain said activating plug in said counterbore against axial movement outwardly of said first part by fluid pressure in said fluid distribution system, said cooperating means for insertion of and retaining of said plug in said counterbore against axial movement outwardly of said first part including thread means on the periphery of said activating plug and complementary thread means on said counterbore for receiving said first-mentioned thread means, and a tubular cutter member carried between said first and second parts and having an arcuate cutting edge projecting forward of a noncutting forward edge and facing said disc, said cutter member being movable toward said disc when said first and second parts are moved axially toward one another to cut and fold a flap from said disc.

19. A coupling as claimed in claim 18 in which an annular cutout is provided on the inner end of said activating plug, said cutout defining with a complementary annular cutout in said counterbore, a chamber, and an O-ring in said chamber for sealing between said plug and said first part.

20. A coupling for use in connecting an end of a service pipe to a fluid distribution system before or while the system is under fluid pressure comprising:

a first part which is an elongated member having a passage therethrough and a second part which is an annular member carried within the passage of the elongated member, said first part being connected to said fluid distribution system and having a counterbore in its passage, an outwardly facing annular shoulder between said counterbore and the passage of said first part, an activating plug carried in the counterbore of said first part, said plug being tubular and having a rupturable disc formed integrally therein intermediate its ends to define a first closed bottom bore facing the shoulder of said first part and a second closed bottom bore facing said second part, means to retain said activating plug in said counterbore against axial movement outwardly of said first part by fluid pressure in said fluid distribution system, a tubular cutter member carried between said first and second parts and having an arcuate cutting edge projecting forward of a non-cutting forward edge and facing said disc, said cutter member being movable toward said disc to cut and and fold a flap from said disc, and stab means for insertion into the passage of said first part for engaging and moving said second part into engagement with and movement of said cutter member.

21. A coupling as claimed in claim 20 in which said elongated member includes means to grip and seal with a smooth end of the service pipe and in which said stab means is the service pipe when the service pipe is stabbed into the elongated member.

22. A coupling as claimed in claim 21 in which said elongated member outwardly of said counterbore is provided with a first annular groove of greater diameter than said counterbore, a second counterbore also of greater diameter than said first counterbore, but of less diameter than said first annular groove to provide an annular shoulder facing said first counterbore, said second counterbore having intermediate its ends a frusto-conical shaped annular groove, and said annular member being a split ring initially carried in said frusto-conical shaped annular groove and being capable of being cammed inwardly thereby when moved axially, said ring being moved along said counterbore until it snaps into said first annular groove.

* * * * *